United States Patent
Oh et al.

(10) Patent No.: US 8,604,967 B2
(45) Date of Patent: Dec. 10, 2013

(54) SYSTEM AND METHOD FOR PROVIDING DRIVING SAFETY

(75) Inventors: Hyun Seo Oh, Daejeon (KR); Hyun Kyun Choi, Daejeon (KR); Hyun Suk Kim, Daejeon (KR); Jong-Hyun Park, Daejeon (KR); Sung Won Sohn, Daejeon (KR); Sangwoo Lee, Daejeon (KR); Woong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 279 days.

(21) Appl. No.: 12/827,174

(22) Filed: Jun. 30, 2010

(65) Prior Publication Data

US 2011/0080312 A1   Apr. 7, 2011

(30) Foreign Application Priority Data

Oct. 7, 2009  (KR) .................. 10-2009-0095223

(51) Int. Cl.
*G01S 13/00*  (2006.01)
*G08G 1/16*  (2006.01)
*G08G 1/00*  (2006.01)
*B60T 8/32*  (2006.01)
*G05D 1/00*  (2006.01)

(52) U.S. Cl.
USPC ................ 342/70; 340/903; 701/93; 701/96; 701/117

(58) Field of Classification Search
USPC .................. 342/70–72; 701/93, 96, 117–119; 340/903
See application file for complete search history.

(56) References Cited

U.S. PATENT DOCUMENTS

| | | | | |
|---|---|---|---|---|
| 4,249,176 A | * | 2/1981 | Oishi et al. ...................... | 342/42 |
| 4,349,823 A | * | 9/1982 | Tagami et al. .................. | 342/70 |
| 5,388,789 A | * | 2/1995 | Rudershausen ........... | 246/167 D |
| 5,572,449 A | * | 11/1996 | Tang et al. ..................... | 700/304 |
| 5,808,561 A | * | 9/1998 | Kinoshita et al. ............. | 340/903 |
| 5,850,176 A | * | 12/1998 | Kinoshita et al. ............. | 340/435 |
| 6,037,860 A | * | 3/2000 | Zander et al. ................. | 340/436 |
| 6,067,031 A | * | 5/2000 | Janky et al. .................... | 340/903 |
| 6,161,071 A | * | 12/2000 | Shuman et al. ................. | 701/48 |
| 6,268,804 B1 | * | 7/2001 | Janky et al. .................... | 340/903 |
| 6,487,500 B2 | * | 11/2002 | Lemelson et al. ............ | 701/301 |
| 6,516,262 B2 | * | 2/2003 | Takenaga et al. .............. | 701/96 |
| 6,741,203 B1 | * | 5/2004 | Woodell ...................... | 342/26 B |
| 6,810,321 B1 | * | 10/2004 | Cook ............................ | 701/117 |

(Continued)

FOREIGN PATENT DOCUMENTS

JP  2001-101599  4/2001
JP  2002-362183  12/2002

(Continued)

*Primary Examiner* — Jack W Keith
*Assistant Examiner* — Peter Bythrow
(74) *Attorney, Agent, or Firm* — Staas & Halsey LLP

(57) ABSTRACT

A safe driving providing system for supporting a safe driving of a vehicle includes: a radar for transmitting a signal of a predetermined frequency bandwidth to a plurality of vehicles, analyzing signals provided by the vehicles, calculating location information and distance information of the vehicles, and finding inter-vehicle distance information of the vehicles based on the location information and the distance information; and a controller for receiving operation speed information from a vehicle information terminal device installed in each vehicle, determining driving safety of the plurality of vehicles based on the received operation speed information and inter-vehicle distance information provided by the radar, and transmitting a warning message for safe driving to the vehicle information terminal device.

6 Claims, 5 Drawing Sheets

(56) References Cited

U.S. PATENT DOCUMENTS

| | | | |
|---|---|---|---|
| 6,859,705 B2* | 2/2005 | Rao et al. | 701/45 |
| 7,109,913 B1* | 9/2006 | Paramore et al. | 342/26 B |
| 7,283,904 B2* | 10/2007 | Benjamin et al. | 701/117 |
| 7,417,577 B2* | 8/2008 | Testud et al. | 342/26 R |
| 7,444,240 B2* | 10/2008 | Macneille et al. | 701/300 |
| 7,508,320 B2* | 3/2009 | Taylor | 340/901 |
| 8,005,602 B2 | 8/2011 | Bando et al. | |
| 8,050,855 B2* | 11/2011 | Coy et al. | 701/119 |
| 8,154,422 B2* | 4/2012 | Hsu et al. | 340/903 |
| 8,165,776 B2* | 4/2012 | Sugawara et al. | 701/96 |
| 8,212,712 B2* | 7/2012 | Bon et al. | 342/26 R |
| 2002/0198660 A1* | 12/2002 | Lutter et al. | 701/301 |
| 2003/0009275 A1* | 1/2003 | Koike | 701/93 |
| 2003/0055562 A1* | 3/2003 | Levy et al. | 701/214 |
| 2003/0102997 A1* | 6/2003 | Levin et al. | 342/57 |
| 2004/0230373 A1* | 11/2004 | Tzamaloukas | 701/208 |
| 2005/0096825 A1* | 5/2005 | Lee | 701/70 |
| 2005/0193954 A1* | 9/2005 | Cureton et al. | 119/53 |
| 2005/0273258 A1* | 12/2005 | MacNeille et al. | 701/300 |
| 2007/0083318 A1* | 4/2007 | Parikh | 701/96 |
| 2007/0109110 A1* | 5/2007 | Ohmura et al. | 340/435 |
| 2007/0164896 A1* | 7/2007 | Suzuki et al. | 342/70 |
| 2008/0040023 A1* | 2/2008 | Breed et al. | 701/117 |
| 2008/0154629 A1* | 6/2008 | Breed et al. | 705/1 |
| 2008/0161987 A1* | 7/2008 | Breed | 701/27 |
| 2008/0288162 A1* | 11/2008 | Theimer et al. | 701/117 |
| 2009/0043435 A1* | 2/2009 | Kane et al. | 701/19 |
| 2009/0251366 A1* | 10/2009 | McClure et al. | 342/357.09 |
| 2009/0289831 A1* | 11/2009 | Akita et al. | 342/70 |
| 2010/0060482 A1* | 3/2010 | Emam et al. | 340/905 |
| 2010/0164789 A1* | 7/2010 | Basnayake | 342/357.04 |
| 2012/0139779 A1* | 6/2012 | Pujol et al. | 342/26 B |

FOREIGN PATENT DOCUMENTS

| | | |
|---|---|---|
| JP | 2004-145479 | 5/2004 |
| JP | 2004-322772 | 11/2004 |
| JP | 2006-193098 | 7/2006 |
| JP | 2007-203860 | 8/2007 |
| JP | 2008-26095 | 2/2008 |
| JP | 2008-186045 | 8/2008 |
| KR | 2000-0026957 | 5/2000 |
| KR | 10-2004-0007377 | 1/2004 |
| KR | 10-2005-0041221 | 5/2005 |
| KR | 10-2005-0069060 | 7/2005 |

* cited by examiner

SYSTEM AND METHOD FOR PROVIDING DRIVING SAFETY

CROSS-REFERENCE TO RELATED APPLICATION

This application claims priority to and the benefit of Korean Patent Application No. 10-2009-0095223 filed in the Korean Intellectual Property Office on Oct. 7, 2009, the entire contents of which are incorporated herein by reference.

BACKGROUND OF THE INVENTION (a) Field of the Invention

The present invention relates to a system and method for preventing rear-ending of a vehicle.

(b) Description of the Related Art

A conventional vehicle safe driving system senses the vehicle's condition by using radar and a vehicle sensor installed in the vehicle, and notifies a driver of the vehicle's condition or provides the same to other nearby vehicles by using vehicle communication.

The vehicle safe driving system increases the cost of the vehicle since a radar has to be attached to the vehicle, and performance of the radar influences system reliability.

The vehicle safe driving system has a problem that the range of the vehicle condition is restricted since it senses the vehicle condition by installing an image detector, a radar, or a sensor in the vehicle.

Also, a vehicle radar installed in the vehicle safe driving system is expensive and has a limit for recognizing objects or distance, and when it is applied to a vehicle, the efficiency is degraded in consideration of the cost and performance.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a safe driving providing system and method for providing a vehicle's safe driving and an emergency rescue service.

An exemplary embodiment of the present invention provides a safe driving providing system for supporting safe driving of a vehicle, including: a radar for transmitting a signal of a predetermined frequency bandwidth to a plurality of vehicles, analyzing signals provided by the vehicles, calculating location information and distance information of the vehicles, and finding inter-vehicle distance information of the vehicles based on the location information and the distance information; and a controller for receiving operation speed information from a vehicle information terminal device installed in each vehicle, determining driving safety of the plurality of vehicles based on the received operation speed information and inter-vehicle distance information provided by the radar, and transmitting a warning message for safe driving to the vehicle information terminal device.

Another embodiment of the present invention provides a safe driving providing method of a base station for supporting a vehicle's safe driving, including: receiving operation speed information and vehicle location information from vehicle information terminal devices installed in a plurality of vehicles; calculating location information and distance information of the vehicles by using a radar, and finding inter-vehicle distance information of the vehicles by using the location information and the distance information; and determining driving safety of the vehicles based on the inter-vehicle distance information and the operation speed information, and transmitting a warning message for safe driving to the vehicle information terminal device.

DETAILED DESCRIPTION OF THE EMBODIMENTS

Figure 1:
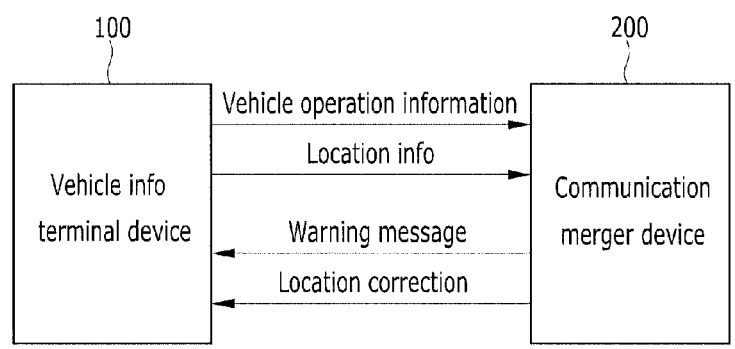
FIG. 1 shows a safe driving providing system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

FIG. 1 shows a safe driving providing system according to an exemplary embodiment of the present invention.

The safe driving providing system includes a vehicle information terminal device 100 and a communication merger device 200.

The vehicle information terminal device 100 generates vehicle operation information and vehicle location information collected from the vehicle in real time, and transmits them to the communication merger device 200. Here, vehicle operation information includes vehicle's running speed, deceleration state, acceleration state, and fuel consumption information.

The communication merger device 200 has a radar 202 for detecting inter-vehicle distance information of a plurality of vehicles, determines vehicle's driving safety based on the vehicle operation information and inter-vehicle distance information provided by the vehicle information terminal device 100, generates a warning message for safe driving, and transmits the warning message to the vehicle information terminal device 100.

Figure 2:
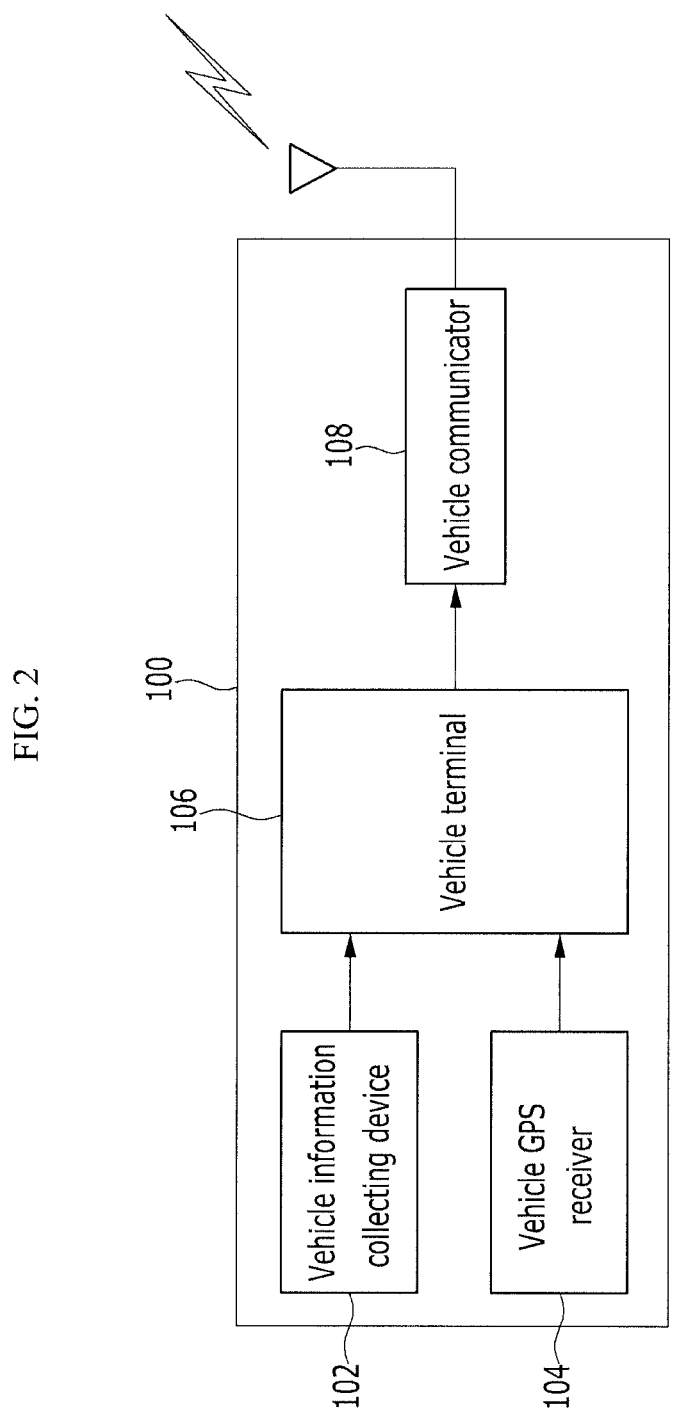
FIG. 2 shows a block diagram of an internal configuration of a vehicle information terminal device according to an exemplary embodiment of the present invention.

Referring to FIG. 2, a vehicle information terminal device 100 will now be described in detail.

FIG. 2 shows a block diagram of an internal configuration of a vehicle information terminal device 100 according to an exemplary embodiment of the present invention.

The vehicle information terminal device 100 includes a vehicle information collecting device 102, a vehicle global positioning system (GPS) receiver 104, and a vehicle terminal 106.

The vehicle information collecting device 102 collects vehicle operation information output by an electronic control device (ECU) and transmits it to the vehicle terminal 106.

The vehicle GPS receiver 104 calculates vehicle location information by monitoring vehicle's azimuth information from an artificial satellite.

The vehicle terminal 106 receives vehicle operation information from the vehicle information collecting device 102, receives vehicle location information from the vehicle GPS receiver 104, and transmits vehicle operation information and vehicle location information to the communication merger device 200 through a vehicle communicator 108.

Figure 3:
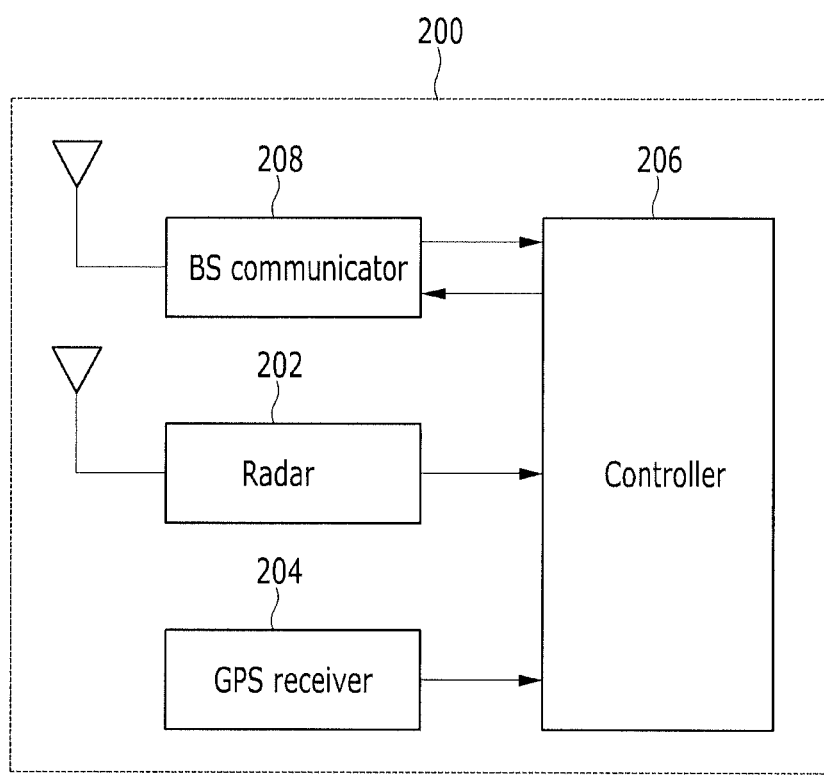
FIG. 3 shows a block diagram of an internal configuration of a communication merger device according to an exemplary embodiment of the present invention.

Referring to FIG. 3, a communication merger device 200 will now be described.

FIG. 3 shows a block diagram of an internal configuration of a communication merger device 200 according to an exemplary embodiment of the present invention.

The communication merger device 200 includes a radar 202, a GPS receiver 204, and a controller 206. Here, the communication merger device 200 represents a function module of the base station.

The radar 202 transmits signals of a predetermined frequency bandwidth to a plurality of vehicles, receives signals from the plurality of vehicles to calculate the vehicles' locations and distances, and acquires inter-vehicle distance information of the vehicles by using the vehicles' locations and distances.

The radar 202 matches the vehicles' locations and inter-vehicle distance information calculated by the radar 220 and vehicle location information and vehicle operation information provided by the vehicle information terminal device 100 to generate safe driving data including respective vehicles' locations, inter-vehicle distance information, and operation speed information.

The GPS receiver 204 receives azimuth information of the communication merger device 200 from the artificial satellite, and calculates first location information of the communication merger device 200.

The controller 206 compares the first location information provided by the GPS receiver 204 and second location information of the communication merger device 200 stored in a memory unit (not shown) to periodically generate a location error value. Here, the location error value is used to correct vehicle location information provided by the vehicle information terminal device 100 or it is transmitted to the vehicle information terminal device 100 to correct vehicle location information of the vehicle information terminal device 100.

The controller 206 calculates location information correction data by correcting vehicle location information provided by the vehicle information terminal device 100 based on the location error value, and transmits the calculated location information correction data to the vehicle information terminal device 100.

Figure 4:
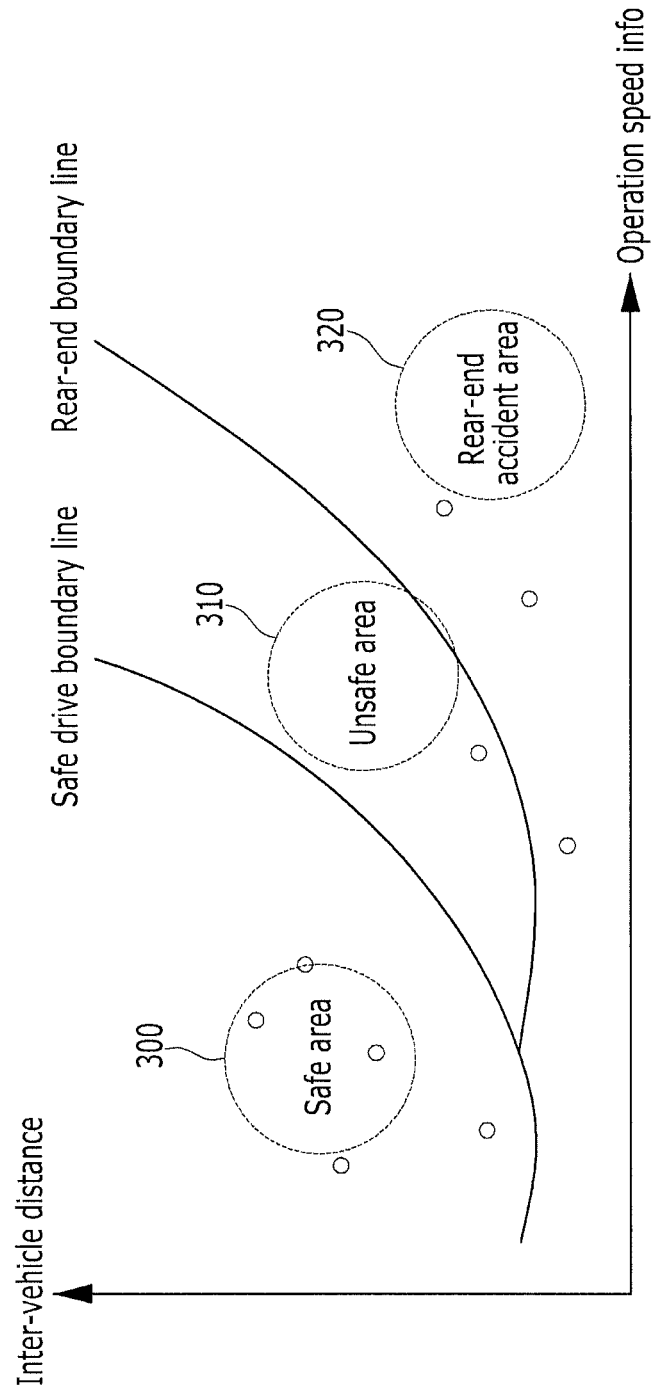
FIG. 4 shows an area for transmitting a warning message for the vehicle's safe driving according to an exemplary embodiment of the present invention.

The controller 206 analyzes inter-vehicle distance information and operation speed information for a plurality of vehicles, and determines the vehicles' driving safety. In detail, as shown in FIG. 4, the controller 206 distinguishes a safe area 300, an unsafe area 310, and a rear-end accident area 320 of the vehicle operation by analyzing the vehicle's inter-vehicle distance information and operation speed information. Here, the unsafe area 310 represents an area where there may be vehicles' rear-ending, and the rear-end accident area 320 represents an area where the vehicles cannot avoid a rear-end accident.

The controller 206 performs no act when the vehicle is operated in the safe area 300, it generates a rear-end warning message when the vehicle is operated in the unsafe area 310, and it generates an emergency rescue message and transmits it to a plurality of vehicle information terminal devices 100 located at a predetermined area when the vehicle is operated in the rear-end accident area 320.

Figure 5:
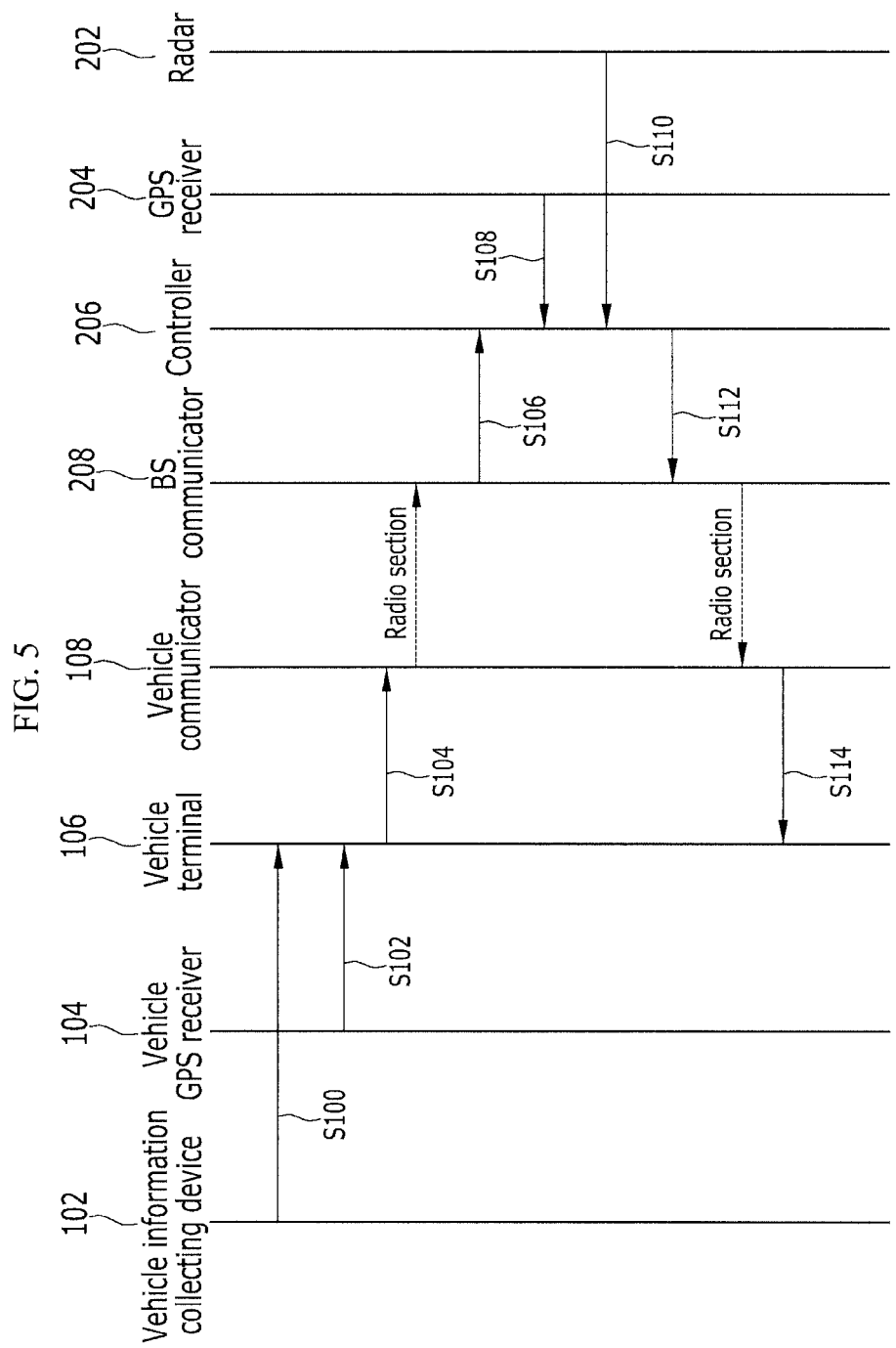
FIG. 5 shows a safe driving providing method according to an exemplary embodiment of the present invention.

Referring to FIG. 5, a safe driving providing method will be described in detail.

FIG. 5 shows a safe driving providing method according to an exemplary embodiment of the present invention.

The vehicle terminal 106 receives vehicle operation information including operation speed information from the vehicle information collecting device 102, receives vehicle location information from the vehicle GPS receiver 104, and transmits vehicle operation information and vehicle location information to the communication merger device 200 through the vehicle communicator 108 (S100, S102, and S104).

The controller 206 receives vehicle location information and vehicle operation information of the vehicle information terminal device 100 through a base station communicator 208 (S106). The controller 206 receives first location information of the communication merger device 200 from the GPS receiver 204, compares it with second location information of the communication merger device 200 stored in a memory (not shown), and periodically calculates a location error value.

The controller 206 calculates location correction data by correcting vehicle location information provided by the vehicle information terminal device 100 based on the location error value.

The radar 202 transmits a signal of a predetermined frequency bandwidth to a plurality of vehicles, receives signals from the plurality of vehicles, calculates locations and distances of the vehicles, and uses the vehicles' locations and distances to find inter-vehicle distance information of the vehicles.

The radar 202 receives vehicle operation information and vehicle location information from the vehicle information terminal device 100, and receives location correction data from which vehicle location information is corrected from the controller 206.

The radar 202 matches vehicle location and inter-vehicle distance information calculated by the radar 220 and vehicle operation information and location correction data provided by the vehicle information terminal device 100 to generate safe driving data including the respective vehicles' location, inter-vehicle distance information, and operation speed information.

The controller 206 receives the safe driving data from the radar 202, analyzes a plurality of vehicles' inter-vehicle distance information and operation speed information to determine the vehicle's driving safety (S108 and S110).

In detail, the controller 206 determines to which one of the safe area 300, the unsafe area 310, and the rear-end accident area 320 the vehicle operation belongs, and generates a rear-end warning message in the case of the unsafe area 310, and an emergency rescue message in the case of the unsafe area 310.

The controller 206 transmits the calculated location correction data and a rear-end warning message or an emergency rescue message for the vehicle's safe driving to the vehicle terminal 106 through the base station communicator 208 and the vehicle communicator 108 (S112 and S114).

According to an embodiment of the present invention, the cost generated by installing a radar in the vehicle is reduced and a vehicle safety device is easily realized by installing a vehicle information terminal device and a vehicle communication module in the vehicle and installing a radar in a base station.

The embodiment of the present invention is applicable to the vehicle safe driving service, rear-end preventing service, and emergency rescue service by analyzing the individual vehicle's operation state and location in real time.

The embodiment of the present invention corrects the vehicle's safe driving and the vehicle's location information to provide new services including high-precision location information and group operation in addition to vehicle safety.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A safe driving providing system for supporting safe driving of a vehicle, comprising:
    a radar for transmitting a signal of a predetermined frequency bandwidth to a plurality of vehicles, analyzing signals provided by the vehicles, calculating location information and distance information of the vehicles, and finding inter-vehicle distance information of the vehicles based on the location information and the distance information, wherein the inter-vehicle distances between three or more vehicles is calculated, so that a distance between a first vehicle and a second vehicle is calculated, a distance between the first vehicle and a third vehicle is calculated and a distance between the second and third vehicles is calculated; and
    a controller for receiving operation speed information from a vehicle information terminal device installed in each vehicle, determining driving safety of the plurality of vehicles based on the received operation speed information and inter-vehicle distance information provided by the radar, and transmitting a warning message for safe driving to the vehicle information terminal device, wherein
    the controller is disposed within a base station and the controller receives first location information from a global positioning system (GPS) receiver, compares it with stored location information of the base station to generate a location error value, and corrects vehicle location information provided by the vehicle information terminal device based on the generated location error value.

2. The safe driving providing system of claim 1, wherein the radar matches the location information and the inter-vehicle distance information with the vehicle location information and the operation speed information provided by the vehicle information terminal device to generate safe driving data including each vehicle's location and the operation speed information.

3. The safe driving providing system of claim 1, wherein the controller transmits the generated location error value to the plurality of vehicle information terminal devices.

4. The safe driving providing system of claim 1, wherein the controller distinguishes a vehicle operation's safe area, unsafe area, and rear-end accident area based on the inter-vehicle distance information and the operation speed information, and transmits the warning message to the vehicle information terminal device when the vehicle operation is in the unsafe area or the rear-end accident area.

5. A safe driving providing method of a base station for supporting a vehicle's safe driving, comprising:
    receiving operation speed information and vehicle location information from vehicle information terminal devices installed in a plurality of vehicles;
    calculating location information and distance information of the vehicles by using a radar, and finding inter-vehicle distance information of the vehicles by using the location information and the distance information, wherein the inter-vehicle distances between three or more vehicles is calculated, so that a distance between a first vehicle and a second vehicle is calculated, a distance between the first vehicle and a third vehicle is calculated and a distance between the second and third vehicles is calculated; and
    determining driving safety of the vehicles based on the inter-vehicle distance information and the operation speed information, and transmitting a warning message for safe driving to the vehicle information terminal device, wherein
    the transmitting of a warning message to the vehicle information terminal device includes:
    receiving first location information from a global positioning system (GPS) receiver, comparing it with stored location information of a base station, and calculating a location error value; and using the calculated location error value to correct vehicle location information provided by the vehicle information terminal device and calculate location correction data, and transmitting the calculated location correction data to the vehicle information terminal device.

6. The safe driving providing method of claim 5, wherein the transmitting of a warning message to the vehicle information terminal device includes:
    determining to which one of a safe area, an unsafe area, and a rear-end accident area the vehicle operation belongs by analyzing the inter-vehicle distance information and the operation speed information; and
    when the vehicle operation is in the unsafe area, generating a rear-end warning message for indicating inter-vehicle rear-end possibility, and when it is in the rear-end accident area, generating an emergency rescue message for requesting a rescue for the rear-end accident, and transmitting the same to the vehicle information terminal device.

* * * * *